United States Patent [19]

Loucks et al.

[11] 4,156,772

[45] May 29, 1979

[54] PROCESS OF FORMING ACYL-COUPLED POLYMERS OF QUINONE-COUPLED POLYPHENYLENE OXIDES

[75] Inventors: George R. Loucks, Scotia; Dwain M. White, Schenectady, both of N.Y.

[73] Assignee: General Electric Company, Schenectady, N.Y.

[21] Appl. No.: 800,648

[22] Filed: May 26, 1977

[51] Int. Cl.² .................... C08G 65/44; C08G 65/48
[52] U.S. Cl. ................................. 528/213; 528/212; 528/214; 528/215
[58] Field of Search ............... 260/47 ET; 528/212, 528/213, 214, 215

[56] References Cited

U.S. PATENT DOCUMENTS

| 3,375,228 | 3/1968 | Holoch et al. | 260/47 |
|---|---|---|---|
| 3,573,254 | 3/1971 | Factor | 260/47 |
| 3,736,291 | 5/1973 | Vogel | 260/47 R |
| 3,784,575 | 1/1974 | Rutledge | 260/396 R |
| 3,970,640 | 7/1976 | Yonemitsu et al. | 260/47 ET |
| 3,987,068 | 10/1976 | Reilly | 260/396 R |

*Primary Examiner*—Lester L. Lee
*Attorney, Agent, or Firm*—F. Wesley Turner; Joseph T. Cohen; Charles T. Watts

[57] ABSTRACT

A process of forming linear, branched and/or cross-linked acyl-coupled polymers of quinone-coupled polyphenylene oxides is described which comprises contacting di- and/or tri-functional acyl halides with quinone-coupled polyphenylene oxides having an average hydroxyl group per molecule value greater than zero including 2.0 or less.

13 Claims, No Drawings

PROCESS OF FORMING ACYL-COUPLED POLYMERS OF QUINONE-COUPLED POLYPHENYLENE OXIDES

CROSS REFERENCE TO RELATED APPLICATIONS

This invention is related to subject matter disclosed in our copending U.S. applications Ser. Nos. 800,645, 800,646, and 800,647, all filed on May 26, 1977. All of the aforesaid applications are also our inventions, are assigned to the same assignee as the assignee of this application, and are incorporated herein in their entirety by reference.

BACKGROUND OF THE INVENTION

1. Field of the Invention

This invention relates to a process of forming linear, branched, and/or cross-linked acyl-coupled polymers of quinone-coupled polyphenylene oxides which comprises contacting di- and/or tri-functional acyl halides with quinone-coupled polyphenylene oxides having an average hydroxyl group per molecule value greater than zero including 2.0 or less.

2. Description of the Prior Art

Self-condensation reactions of certain phenols employing oxygen in combination with an effective oxidative coupling catalyst system to form prior art polyphenylene oxides, i.e., polyphenylene oxides having an average hydroxyl group per molecule of 1.0 or less, are described in various U.S. patent applications including Hay's U.S. Pat. Nos. 3,306,879; 3,914,266; application Ser. No. 540,473, filed Jan. 31, 1975; a continuation-in-part of Ser. No. 441,295, filed Feb. 11, 1974, now abandoned; and Olander's U.S. Pat. Nos. 3,956,442; 3,965,069; 3,972,851 and Ser. No. 582,910, filed June 2, 1975.

Block polymers of prior art polyphenylene oxides employing simple bifunctional coupling compounds such as diacyl halides, diisocyanates, bis(haloaryl)sulfones, etc., are described in White's U.S. Pat. Nos. 3,793,564; 3,770,850; 3,809,729 and 3,875,256.

DESCRIPTION OF THE INVENTION

This invention embodies a process of forming linear, branched, and/or cross-linked acyl-coupled polymers of quinone-coupled polyphenylene oxides which comprises contacting di- and/or tri-functional acyl halides with quinone-coupled polyphenylene oxides having an average hydroxyl group per molecule value greater than zero including 2.0 or less.

The quinone-coupled polyphenylene oxides that are employed in our process can be prepared by the method of Loucks et al. described in copending U.S. Ser. No. 800,646, filed May 26, 1977. Illustrative quinone-coupled polyphenylene oxides are described by the following formula:

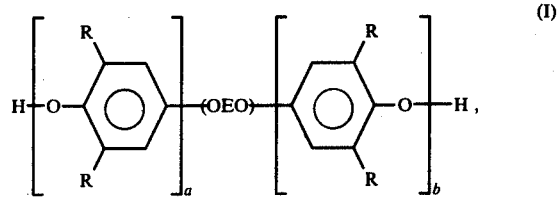
(I)

wherein independently each $-(OEO)-$ is a divalent quinone residue, E is a divalent arene radical, either a or b is at least equal to 1, the sum of a plus b is preferably at least equal to 10, more preferably 40 to 170, and R is hydrogen, a hydrocarbon radical, a halohydrocarbon radical, a hydrocarbonoxy radical or a halohydrocarbonoxy radical.

The acyl halides are employed in our process which can be any acyl halide subject to the proviso that the acyl halide have at least two halide coupling reaction sites. The term "acyl halide" includes any di- or tri-acyl halide illustrated by the formula:

(II)

where c is a number at least equal to 2, X is a halogen, e.g. fluorine, chlorine, bromine or iodine, but preferably chlorine, and R" is $C_{1-8}$ alkylene, $C_{1-8}$ alkenylene, phenylene, halophenylene and $C_{1-8}$ alkyl substituted phenylene.

Illustrative of a portion of presently preferred acyl halides that can be employed in our process are the acid halides of the following acids: malonic, succinic, maleic, fumaric, itaconic, mesaconic, citraconic, glutaric, adipic, pimelic, suberic, azelaic, trimellitic, phthalic, isophthalic, terephthalic and the above phthalic acids having from one to four halogens, preferably chloro substituents or from one to four $C_{1-8}$ alkyl substituents. The preferred phthalic acid halides are unsubstituted or have from 1 to 2 chlorine substituents.

Illustrative of the broad group of acyl-coupled polymers of quinone-coupled polyphenylene oxides that can be prepared according to our process, among others, are those described by the following illustrative linear, branched and cross-linked polymer structures:

```
                    BZB, BZA, BZBZ, ZABZA, BZBZB,
(III linear)         AZBZBZBZA, etc.

AZA
                    A   B B   B A   B
(III branched)  BZB, BZBZB, BZBZA, AZBZBZA, etc.

A           A
                  A      Z           Z    A
(III cross-linked)  BZBZBZB, AZBZBZB, AZBZBZBZA, etc.
                  B      B   B   B   B    B
                  AZBZBZBZA AZBZBZA AZBZBZA
                         A           A
``` wherein A represents a monovalent phenoxy residue of a polyphenylene oxide of formula (IV) described hereinafter, B represents a divalent phenoxy residue of a quinone-coupled polyphenylene oxide of formula (I) and Z represents a di- or a tri-valent acyl halide residue of formula (II). The above illustrative linear branched cross-linked combinations of monovalent phenoxy radicals, divalent phenoxy radicals, and di- and/or tri-functional acyl radicals are not intended to limit the combinations that can be obtained by the practice of this invention since such combinations are limited only by the stoichiometric amounts of the representative precursors of the various radicals charged to the reaction medium in carrying out the process of this invention.

The end capping agent polyphenylene oxide precursors of monovalent phenoxy residues represented hereinbefore by A can be described by the following formula:

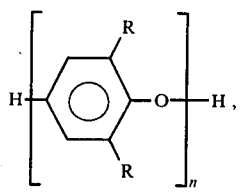

wherein independently each R is as defined hereinbefore and n is a number of at least 10, preferably 40 to 170.

Our process is carried out by introducing an acyl halide to a solution of a quinone-coupled polyphenylene oxide under fluid mixing conditions wherein the solution experiences high fluid shear stress since our process is highly sensitive to the dispersion of the reactants. In a preferred embodiment, the coupling reaction is carried out while introducing the acyl halide to the quinone-coupled polyphenylene oxide solution at a point or region within a reaction environment near a mixing impeller, e.g. an axial-flow or radial flow impeller, such as a marine-type mixing propeller, fan turbine, pitched paddle, curved blade turbine, spiral backswept turbine, flat-blade turbine, gate impeller, anchor impeller, etc., in order to establish and maintain high fluid shear rates and accordingly relatedly high fluid shear stresses. The addition of acyl halide under the aforesaid process conditions facilitates the establishment and maintenance of a substantially uniform dispersion of reactants, acyl halide, quinone-coupled polyphenylene oxide, water soluble base, and catalytic phase transfer agent, and accordingly optimum process efficiency. In general, process equipment employing high-speed axial-flow impeller mixers are presently preferred in our process.

Advantageously and preferably, our process can be carried out employing substantially the exact stoichiometric amounts of acyl halide required to completely couple essentially all of the quinone-coupled polyphenylene oxide reactant while obtaining optimum increases in the acyl coupled quinone-coupled polyphenylene oxide intrinsic viscosity. Preferably the acyl halide is added to the reaction medium continuously during the course of the reaction so that the exact stoichiometric acyl halide requirements for completion of the coupling reaction are only satisfied as the last portion of acyl halide is added to the reaction medium.

In a preferred embodiment, our process is carried out in the substantial absence of any hydrolyzing agent, e.g. water methanol, etc., or other chemical constituents which can promote undesirable side reactions, such as primary or secondary amines. Accordingly, it is highly desirable that the individual and preferably the collective water, methanol, etc., primary and secondary amine content be limited to less than 1%, and more preferably less than ½% based on the weight of quinone-coupled polyphenylene oxide reactant.

The acyl halide coupling reaction is carried out in the presence of water soluble base, preferably in solution in an aqueous phase. The water soluble base can be any water soluble base which, in the presence of polyphenylene oxides, can convert substantially all of the hydroxy groups associated therewith to phenoxides, i.e. alkali metal or alkaline earth metal cation phenoxides or "onium" phenoxides derived from catalytic phase transfer agents described in greater detail later herein. Further illustrative of the bases that can be employed are alkali metal or alkaline earth metal hydroxides and carbonates, e.g. potassium hydroxide, sodium hydroxide, sodium monocarbonate, barium carbonate, etc. In general, any amount of water soluble base can be employed, e.g. 0.1 to about 1000, preferably 1 to about 20, and more preferably 1.5 to about 5 moles of base per hydroxyl group associated with the polymers as identified by hydroxyl group infrared absorption at 3610 cm.$^{-1}$ based on a 2.5% solution in a $CS_2$ over a 1 cm. path calibrated against $CS_2$ in a matched cell. Further, preferably, the water soluble base is employed in solution in an aqueous phase wherein the water soluble base content is at least 10% and more preferably at least 25-50% by weight of the aqueous base solution.

Preferably the acyl halide coupling reaction is carried out in the presence of a catalytic phase transfer agent. The agent can be any phase transfer agent known to those skilled in the art, e.g. quaternary ammonium compounds, quaternary phosphonium, tertiary sulfonium compounds, etc., including mixtures thereof. Presently preferred phase transfer agents can be described by the formulae:

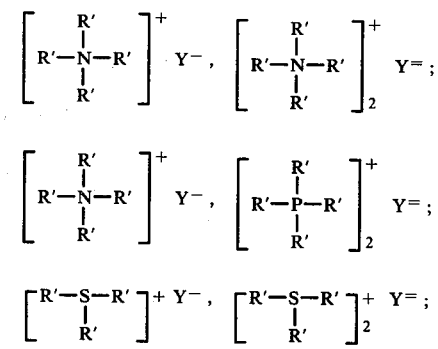

wherein each R' is independently selected from aliphatic hydrocarbon radicals having from about 1 to about 30 carbon atoms, preferably from about 2 to about 15 carbon atoms, each $Y^-$ is selected from the group consisting of $Cl^-$, $Br^-$, $F^-$, $CH_3SO_3^-$, $CH_3CO_2^-$, $CF_3CO_2^-$ or $OH^-$, and each $Y^{--}$ is selected from the group consisting of $SO_4^{--}$, $CO_3^{--}$, or $C_2O_4^{--}$. The catalytic phase transfer agents can also be employed in any amount, e.g. in amounts of from 0.001 to 10, preferably from 0.01 to 1.0, and more preferably from 0.05 to 0.5 moles based on the molar amounts of hydroxyl groups associated with the polymer.

Broadly, reaction time can be any time, e.g. 1/10 hour or less, to 10 hours, or more. Broadly, the reaction temperature can be any temperature, e.g. 0° C. or less to 150° C. or more. Broadly, the reaction pressures can be any pressure, e.g. subatmospheric, atmospheric or superatmospheric. Preferably, the reaction is carried out under optimum time, temperature and pressure reaction conditions which integrates substantially all, e.g. 90-99% or more of the halide contained within the reaction medium into the polymer backbone during the process. Broadly, the acyl-coupled quinone-coupled polyphenylene oxides can be isolated from the reaction medium by any means employed heretofore to isolate the polymer produced by the processing of Hay and Orlander. Preferably, the products of our process are isolated from the reaction medium by spray drying, steam precipitation or any other method which avoid costly distillation procedures involving the separation by distillation of mixed solvents.

EXAMPLE I

(A) Polymer Preparation, and (B) Catalyst Deactivation

A 2.5 gallon stainless steel reactor equipped with an air-driven paddle stirrer, oxygen inlet tube, and water-cooled coil and jacket was charged with 4.35 l. toluene, a catalyst stock solution formed by dissolving 0.78 g. of cuprous oxide in 5.9 g. of 48% hydrobromic acid, 1.2 g. of Aliquat ® 336, 3.38 g. N,N'-di-t-butylethylenediamine (DBEDA), 47.6 g. N,N-dimethylbutylamine (DMBA), and 12 g. di-n-butylamine (DBA). Oxygen was bubbled through the reaction medium at a rate of 7 SCFH and the mixture was stirred vigorously. 1200 g. 2,6-xylenol in 1.2 l. of toluene was pumped into the reactor over a 30-minute period and the reaction temperature was maintained at 25° C. The temperature was then allowed to rise to 38° C. After 50 minutes, the reaction product was contacted with an aqueous solution of the trisodium salt of EDTA to deactivate the catalyst. Summarily, the reaction parameters relative to molar ratios of 2,6-xylenol: Cu:DBEDA:DMBA:Br:DBA were as follows: 900:1:1.8:43:3.2:8.5.

(C) Quinone Coupling

A 500 g. portion of the reaction mixture as described in sections (A) and (B) above was transferred to a 1 l. flask equipped with stirrer, nitrogen inlet tube, distillation head and thermometer. With a steady nitrogen sweep, the mixture was heated to 90° C. and maintained at 90° C. for 30 minutes while 80 ml. of volatiles were entrained out of the flask. During this time, the deep orange TMDQ color disappeared leaving a very light yellow solution.

(D) Coupling With Isophthaloyl Chloride

The reaction mixture from part (C) above was cooled to 40° C. and transferred to a 1 l. Waring blender, kept under a nitrogen atmosphere and contacted with 0.5 g. Aliquat ® 336 and 6.4 g. 50% aqueous sodium hydroxide. The mixture was stirred in the blender at maximum speed and 3.2 g. crystalline isophthaloyl chloride was added over a two minute period. Stirring was continued an additional 2 minutes. Then 500 ml. toluene was added and the polymer was precipitated by the addition of 3 l. of methanol. The polymer was washed with methanol and dried at 80° C. The intrinsic viscosity of the polymer before coupling was 0.45 dl./g. and after coupling was 0.61 dl./g.

The phenolic hydroxyl absorbance at 3610 cm.$^{-1}$ (in carbon disulfide) was 0.064 absorbance units for a 2.5% solution of the initial polymer in a 1.0 cm. cell. The quinone coupling reaction increased the value to 0.150 absorbance units. After the isophthaloyl chloride coupling step the value was 0.003.

EXAMPLE II

(A) Polymer Preparation, and (B) Catalyst Deactivation

A 2.5 gallon stainless steel reactor equipped with an air-driven paddle stirrer, oxygen inlet tube, and water-cooled coil and jacket was charged with 4.6 l. toluene, a catalyst premix composed of 6.28 g. of cupric chloride, 9.62 g. of sodium bromide, 6.84 g. of Aliquat ® 336, 33.1 g. N,N-dimethylbutylamine (DMBA), and 42.3 g. di-n-butylamine (DBA). Oxygen was bubbled through the reaction medium at a rate of 10 SCFH with vigorous mixing of the reaction mixture. 2000 g. 2,6-xylenol in 2.4 l. of toluene was pumped into the reactor over a 30-minute period. The temperature of the reaction mixture rose to 45° C. and was maintained at 45° C. until after a total reaction time of 70 minutes, the polymer portion was precipitated with methanol containing 0.5% acetic acid, filtered and washed, dried in a circulating air oven at 80° C. Polymer analysis showed an intrinsic viscosity [$\eta$] equal to 0.24 dl./g. and a TMDQ content less than 0.01% based on the weight of 2,6-xylenol. Summarily, the reaction parameters relative to molar ratios of 2,6-xylenol: Cu:DMBA:Br:DBA were as follows: 350:7:7:2:1.

(C) Quinone Coupling

A reaction vessel equipped with a nitrogen inlet tube and a Vibromixer stirrer was charged with a solution of 10.00 g. of the polymer from part (A) above in 30 ml. chlorobenzene and with 0.20 g. 3,3',5,5'-tetramethyldiphenoquinone (TMDQ). The mixture was heated to 80° in an oil bath with stirring under nitrogen. The TMDQ gradually dissolved and the red-orange color of the TMDQ gradually diminished.

(D) Coupling With Isophthaloyl Chloride

After one hour the mixture was cooled to 45° C. and contacted with 0.5 ml. of a 10% Aliquat ® 336 solution in chlorobenzene and with 0.8 g. 50% aqueous sodium hydroxide solution. To the rapidly stirred mixture at 40° was added 0.55 g. isophthaloyl chloride crystals over a 5-minute period. Five minutes after the addition was completed the viscous mixture was diluted with 100 ml. benzene and the polymer was precipitated by adding slowly with stirring 400 ml. of methanol containing 1% acetic acid. The polymer was collected on a filter funnel washed with methanol and dried at 80° to constant weight (10.03 g.). The intrinsic viscosity of the initial polymer was 0.24 dl./g. After coupling with isophthaloyl chloride the intrinsic viscosity was 0.37 dl./g.

As illustrated by the foregoing examples, acyl halides can be reacted with quinone-coupled polyphenylene oxides under widely varying reaction conditions to form acyl-coupled quinone-coupled polyphenylene oxides. Preferred acyl-coupled polymers prepared in accordance with our process are linear polymers wherein resulting quinone-coupled polyphenylene oxide polymers are essentially linear polymers and more preferably are essentially linear polymers wherein all available hydroxyl components have been end capped so that the hydroxyl content of the resulting polymer is essentially nil.

The acyl-coupled quinone-coupled polyphenylene oxides of our process can have any intrinsic viscosity and any number average molecular weight $\overline{M}_n$. Presently preferred polymers of our process generally have an $\overline{M}_n$ value of 5,000 to 60,000, more preferably 15,000 to 30,000, having generally corresponding intrinsic viscosities of 0.17 to 1.7, and 0.4 to 0.7, respectively.

The polymers of this invention can be combined with other fillers, modifying agents, etc., such as dies, pigments, stabilizers, flame retardant additives with beneficial results.

We claim:

1. A process of forming acyl-coupled polymers of quinone-coupled polyphenylene oxide which comprises contacting in a high fluid shear stress reaction medium an acyl halide with quinone-coupled polyphenylene oxides having an average hydroxyl group per molecule value greater than zero including 2.0 or less.

2. The claim 1 process, wherein the acyl halide is of the formula:

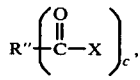

where c is a number at least equal to 2, X is fluorine, chlorine, bromine or iodine, and R'' is $C_{1-8}$ alkylene, $C_{1-8}$ alkenylene, phenylene, halophenylene and $C_{1-8}$ alkyl substituted phenylene, and wherein the quinone-coupled polyphenylene oxide is of the formula:

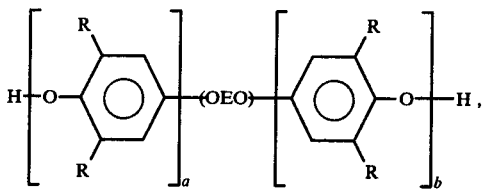

wherein independently each $-(OEO)-$ is a divalent quinone residue, E is a divalent arene radical, either a or b is at least equal to 1, the sum of a plus b is preferably at least equal to 10, more preferably 40 to 170, and R is hydrogen, a hydrocarbon radical, a halohydrocarbon radical, a hydrocarbonoxy radical or a halohydrocarbonoxy radical.

3. The claim 2 process, wherein —OEO— is of the formula:

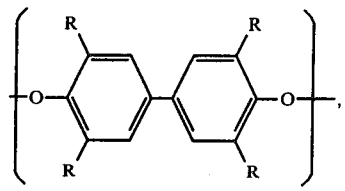

wherein independently each R is as defined hereinbefore.

4. The claim 3 process, wherein the sum of a plus b is 40 to 170.

5. The claim 4 process, wherein each R is hydrogen, a hydrocarbon, or a halohydrocarbon radical.

6. The claim 5 process, wherein each R is a methyl radical.

7. The claim 1 process, carried out in the substantial absence of a hydrolyzing agent.

8. The claim 7 process, carried out in the presence of water soluble base.

9. The claim 8 process, carried out in the presence of a catalytic phase transfer agent.

10. The claim 6 process wherein substantially the exact stoichiometric amount of acyl halide required to completely couplt essentially all of the quinone-coupled polyphenylene oxide is present.

11. The claim 10 process wherein the acyl halide requirement for completion of the coupling reaction is only satisfied as the last portion of the acyl halide is added to the reaction medium.

12. The claim 11 process carried out in the substantial absence of any hydrolyzing agent.

13. The claim 12 process wherein the reaction medium contains less than about 1% by weight hydrolyzing agent based on the weight of quinone-coupled polyphenylene oxide reactant.

* * * * *